INVENTOR.
Josef Waggin
BY Walter S. Pleston

ATTORNEY.

Patented Nov. 27, 1951

2,576,494

UNITED STATES PATENT OFFICE 2,576,494

RELEASING DEVICE FOR MIRROR REFLEX ADAPTERS FOR PHOTOGRAPHIC CAMERAS

Josef Waggin, Memmingen, Bavaria, Germany, assignor to Karl Muller Jr. Photo-Kino-Radio, a firm, Memmingen, Bavaria, Germany Application March 26, 1949, Serial No. 83,602
In Germany October 1, 1948

5 Claims. (Cl. 95—42)

The invention relates to a releasing device for mirror reflex adapters or front appliances for photographic cameras.

In the known appliances of this type in most instances combined or coupled wire releasers are used which are difficult to adjust and cumbersome when working with the camera. Exposures in a quick succession and out of the free hand are almost impossible since the releaser must not be let go before the shutter has run down to prevent the mirror from falling into the trace of the rays of the exposure lens system.

It is the object of the present invention to provide a releasing device which avoids these drawbacks.

With this object in view, the releasing device according to the present invention comprises a head to be attached to the camera, with a releaser which acts directly upon the releaser of the camera and simultaneously, through mechanical transmitting means arranged in the head, e. g. levers, upon the releaser provided at the mirror reflex adapter. In order that the device may be effective independently of the actual position of the mirror reflex adapter which in known manner is swingable through 90°, operating means for the release are provided at the front appliance at each of two points which are relatively displaced by the angle of swinging, which operating means cooperate alternately with the releasing lever of the releasing head attached to the camera, depending on the position of the front appliance.

In a preferred form of the invention the mirror which normally is held in its position of rest by a spring can be held in its operative position by a locking device whose unlocking is effected by the releaser. To this end the mirror is appropriately swingable about an axis disposed underneath its plane, whereby a gentle "drawing" striking of the mirror against the casing is ensured and the movement of the mirror is not hindered by objectives projecting deeper into the front appliance.

Further objects and features of the invention will be seen from the following detailed description in connection with the accompanying drawing, showing by way of example and purely schematically an embodiment of the invention and in which.

Similar reference numerals denote similar parts in the different views.

Figure 1:
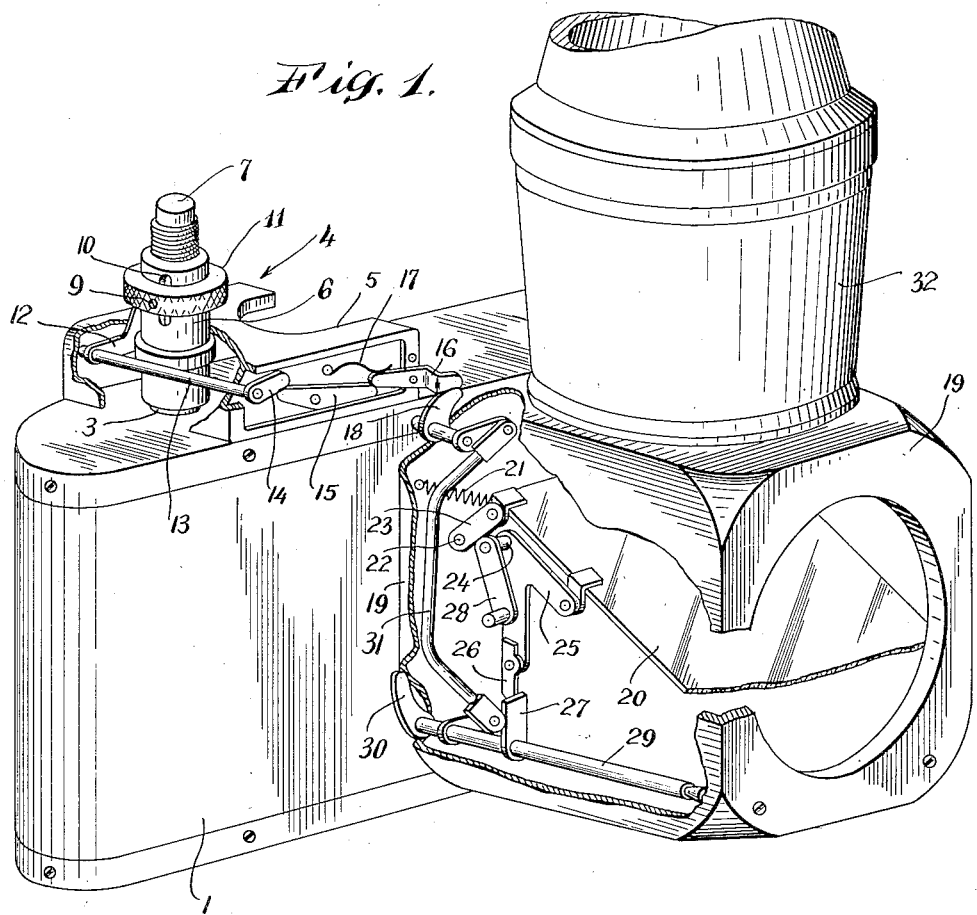
Fig. 1 is a perspective view of a camera provided with a mirror reflex adapter whose casing is shown partly in section the same as the casing of the releasing head mounted on the camera.
Figure 2:
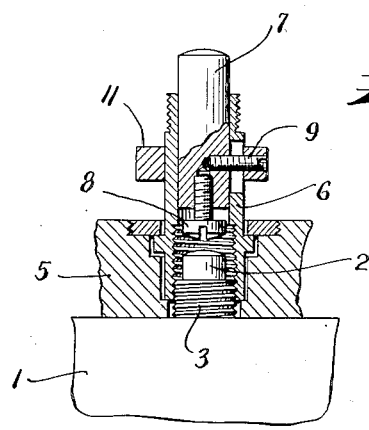
Fig. 2 is a vertical section through the releasing head of the camera.

Referring now to the drawing in greater detail, it will be seen that the releaser of the camera 1 is formed in the usual manner by a push button 2 which is guided in a sleeve 3 provided with external thread. My novel releasing head 4 can be screwed on this releaser and consists substantially of the casing 5 resting on the camera and a sleeve 6 rotatably seated therein. The end of sleeve 6 is internally threaded and adapted to be screwed on the sleeve 3 of the camera releaser, as a cap nut. The releasing knob 7 is guided at the opposite end of sleeve 6 and includes an adjusting screw 8 permitting adjustment of the distance between the two releasing knobs 7 and 2 which is important for the delay of the release of the camera in relation to the release of the front appliance. By means of radial cross pins 9 which are guided in longitudinal slots 10 of sleeve 6 the releasing knob 7 is connected with a ring 11 slidable on the sleeve which ring serves on the one hand as a grip for screwing on and off the release head and on the other hand when depressing the release knob 7 presses on lever 12. This lever turns the shaft 13 supported in part 5 and acting by an arm 14 through a seesaw lever 15 upon a two-armed lever 16 one arm of which cooperates with the releaser 18 of the mirror reflex adapter 19. The spring 17 bearing against the opposite end of the two-armed lever 16 permanently urges the end of lever 12 against ring 11.

The mirror 20 arranged in the casing 19 of the front appliance 32 is normally held in its position of rest by a spring 21 and is swingable about a pivot 22 underneath its plane which pivot may be formed by two pins secured on both sides in the casing and forming the fulcrums for the links 23. Moreover, the pivot 24 of an angle lever 25 is mounted in casing 19, one arm of this angle lever being jointed to the mirror 20 while the other arm bears a stop 26 which can be swung out in one direction only and together with an arm 27 operated by the releaser forms the locking gear for the mirror in the operative position thereof when making the adjustments for the exposure. Seated on shaft 24 outside of casing 19 is a lever 28 serving as a handle for swinging the mirror into its operative position.

The arm 27 is mounted on a shaft 29 whose end extending through casing 19 carries the releaser 30. Moreover the shaft 29 is connected by means of a link 31 to the above mentioned releaser 18 of the front appliance. The two releasers 18 and 30 are arranged at the front appliance in such a way as to cooperate alternately with the releasing lever 16 of head 4. The arm 27 locking the mirror 20 in its operative position can be released both by the releaser 18 and by the releaser 30.

My novel releasing device offers a number of substantial advantages. The camera can be operated in case of a normal exposure without any front appliance, and without the possibility of disturbances by wires, cables etc. The releasing device is independent of the actual angular position of the front appliance. Even when photographing without the front mirror the releasing head can be left on the camera without impairing the photographing with the normal optical system. Free hand exposures in an upright or horizontal position can easily be made without any hindrance by the front mirror, and no more force or consideration is required for the releasing than in case of an exposure without a front appliance. The difference in time between the mirror release and the camera release can be adjusted to the optimum value in the releasing device according to the invention by adjustment of screw 8.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In a photographic camera including an objective lens, an adapter attachable to said camera by substituting it for said objective lens and including a reflex mirror and lens unit, said unit having two positions spaced 90 degrees from each other into which it can be selectively swung when attached, said unit including two mirror-tripping elements spaced 90 degrees from each other, the one or other one of which elements being in a predetermined position depending on the position into which the unit is swung, a head structure attachable to said camera, a manually operative member guided in said structure, and mechanical transmitting means accommodated in said structure and being in operative connection with said member and with that mirror-tripping element which is in said predetermined position when both said adapter and said head structure are attached to said camera.

2. In a photographic camera including an objective lens and a shutter-tripping element, an adapter attachable to said camera by substituting it for said objective lens and including a reflex mirror and lens unit, said unit having two positions spaced 90 degrees from each other into which it can be selectively swung when attached, said unit including two mirror-tripping elements spaced 90 degrees from each other, the one or the other one of which elements being in a predetermined position depending on the position into which the unit is swung, a head structure attachable to the camera, a manually operative member guided in said structure in a path so as to engage and actuate said shutter-tripping element, and mechanical transmitting means accommodated in said structure and being in operative connection with said member and with that mirror-tripping element which is in said predetermined position when both said adapter and said head structure are attached to said camera.

3. For a photographic camera including an objective lens, an adapter device comprising a reflex mirror and lens unit attachable to said camera by substituting it for said objective lens, and a structure attachable to the head of said camera, said unit comprising a casing in which said mirror is pivoted, a spring in connection with said mirror and tending to hold it in an inoperative position, a bell crank lever pivotally mounted in said casing, one arm of said lever being joined to said mirror, a unidirectionally swingable pawl pivoted to the second arm of said lever, a latch movable across the path of said pawl to engage the latter so as to lock said mirror in its operative position, and a swingable arm pivoted in said casing and to which said latch is secured, and said head structure comprising, a manually operative member guided in said structure, and mechanical transmitting means accommodated in said structure and in operative connection with said member and with said swingable arm, thereby, to withdraw said latch and to trip said mirror by actuation of said member when both said unit and said head structure are attached to the camera.

4. A device as claimed in claim 3 further comprising a lever mounted on the pivot pin of said bell crank lever outside said casing to swing said mirror into its operative position.

5. In combination with a photographic camera having an objective lens and a shutter-tripping knob guided in an externally threaded sleeve, an adapter device comprising a reflex mirror and lens unit, said unit being attachable to the camera by substituting it for said objective lens and including operative means in connection with said mirror to trip the latter, a head structure including a rotatable second sleeve substantially in the form of a cap nut, said structure being attachable to the camera by screwing said second sleeve on said externally threaded sleeve, a second knob guided in said second sleeve, a ring slidable on said second sleeve, a pin connecting said ring to said second knob through an axial slot in said second sleeve, a shaft pivoted in said structure, two arms secured to said shaft one of said arms being in engagement with said ring, a see-saw lever in engagement with the other one of said arms, a second lever having one arm in engagement with said see-saw lever and having another arm engaging said mirror tripping means, and a spring in connection with one of said levers and tending to turn the interengaging levers and arms in a direction to raise said ring and said second knob.

JOSEF WAGGIN.

REFERENCES CITED

The following references are of record in the file of this patent:

UNITED STATES PATENTS

| Number | Name | Date |
| --- | --- | --- |
| 2,182,097 | Schenk | Dec. 5, 1939 |
| 2,466,664 | Soreny | Apr. 5, 1949 |
| 2,480,336 | Orme | Aug. 30, 1949 |

FOREIGN PATENTS

| Number | Country | Date |
| --- | --- | --- |
| 469,710 | Germany | Dec. 19, 1928 |
| 760,954 | France | Dec. 27, 1933 |
| 606,527 | Germany | Dec. 4, 1934 |
| 782,058 | France | Mar. 11, 1945 |